US010853024B2

(12) United States Patent
Choi et al.

(10) Patent No.: US 10,853,024 B2
(45) Date of Patent: Dec. 1, 2020

(54) METHOD FOR PROVIDING INFORMATION MAPPED BETWEEN A PLURALITY OF INPUTS AND ELECTRONIC DEVICE FOR SUPPORTING THE SAME

(71) Applicant: Samsung Electronics Co., Ltd., Gyeonggi-do (KR)

(72) Inventors: Yoonjung Choi, Gyeonggi-do (KR); Iseul Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/360,175

(22) Filed: Mar. 21, 2019

(65) Prior Publication Data
US 2019/0294408 A1    Sep. 26, 2019

(30) Foreign Application Priority Data
Mar. 21, 2018 (KR) .................. 10-2018-0032444

(51) Int. Cl.
*G06F 3/16* (2006.01)
*G06F 3/0484* (2013.01)
(Continued)

(52) U.S. Cl.
CPC .......... *G06F 3/165* (2013.01); *G06F 3/03545* (2013.01); *G06F 3/0482* (2013.01);
(Continued)

(58) Field of Classification Search
CPC ........ G06F 3/165; G06F 3/167; G06F 3/0482; G06F 3/04886; G06F 3/03545; G06F 3/04855; G06F 2203/04803; G10L 15/26
See application file for complete search history.

(56) References Cited

U.S. PATENT DOCUMENTS 9,514,749 B2    12/2016 Lee et al.
2013/0311186 A1    11/2013 Lee et al.
(Continued)

FOREIGN PATENT DOCUMENTS

KR    10-2013-0129747 A    11/2013
KR    10-2013-0130396 A    12/2013
WO    2013/176366 A1    11/2013

OTHER PUBLICATIONS

European Search Report dated Aug. 26, 2019.

*Primary Examiner* — Shourjo Dasgupta
(74) *Attorney, Agent, or Firm* — Cha & Reiter, LLC.

(57) ABSTRACT

An electronic device is provided. The electronic device includes a microphone, a touch screen display, a processor, and memory. The memory stores instructions, when executed, causing the at least one processor to: output a screen where a specified application is executed, the screen including a first interface configured to support recording a voice input through the at least one microphone and a second interface configured to receive content input of a user, on the touch screen display; pairing and storing in the memory each one of a plurality of recorded voice inputs to the first interface with a corresponding one of a plurality of content inputs to the second interface, thereby forming a voice-content pair, wherein the voice input and content input of each voice-content pair are contemporaneously recorded and received; receive a user input based on a keyword for specified content; select at least one recorded voice-content pair in response to the user input; convert recorded voice inputs of the at least one voice-content pair into text data; and output the converted text data on the touch screen display.

19 Claims, 14 Drawing Sheets

(51) Int. Cl.
*G06F 3/0485* (2013.01)
*G10L 15/26* (2006.01)
*G06F 3/0354* (2013.01)
*G06F 3/0482* (2013.01)
*G06F 3/0488* (2013.01)

(52) U.S. Cl.
CPC ...... *G06F 3/04855* (2013.01); *G06F 3/04886* (2013.01); *G06F 3/167* (2013.01); *G10L 15/26* (2013.01); *G06F 2203/04803* (2013.01)

(56) References Cited

U.S. PATENT DOCUMENTS

| | | | |
|---|---|---|---|
| 2014/0278408 A1* | 9/2014 | Park | G06F 3/0488 |
| | | | 704/235 |
| 2016/0124634 A1 | 5/2016 | Sung | |
| 2016/0337580 A1* | 11/2016 | Kwon | G06F 3/14 |
| 2019/0005959 A1* | 1/2019 | Cameron | G06F 3/165 |

* cited by examiner

METHOD FOR PROVIDING INFORMATION MAPPED BETWEEN A PLURALITY OF INPUTS AND ELECTRONIC DEVICE FOR SUPPORTING THE SAME

CROSS-REFERENCE TO RELATED APPLICATION(S)

This application is based on and claims priority under 35 U.S.C. § 119 to Korean Patent Application No. 10-2018-0032444, filed on Mar. 21, 2018, in the Korean Intellectual Property Office, the disclosure of which is incorporated by reference herein its entirety.

BACKGROUND

1. Field

The disclosure relates to technologies of providing information mapped between a plurality of inputs.

2. Description of Related Art

In recent years, electronic devices have supported a variety of input modes as a way of aiming at interaction with users. For example, an electronic device may support a voice-based input mode according to user utterances as well as an input mode using a software input panel (SIP) keyboard, a stylus pen, or the like. Alternatively, the electronic device may support a multimodal interface input mode for operating the above-mentioned input modes in a complex manner.

The above information is presented as background information only to assist with an understanding of the present disclosure. No determination has been made, and no assertion is made, as to whether any of the above might be applicable as prior art with regard to the present disclosure.

SUMMARY

In connection with recording information associated with a specific event, an electronic device may receive a multi-modal interface input from a user. For example, the electronic device may receive and record a voice input associated with the event and may simultaneously receive and store a content input (e.g., a text input or the like) including information associated with the voice. In this case, the electronic device may separately process recording data and content data, which are caused by the same event. Thus, the electronic device may fail to satisfy user needs to identify information (e.g., recording information and content information) about the same event in a complex manner or may fail to provide convenience.

Aspects of the present disclosure are to address at least the above-mentioned problems and/or disadvantages and to provide at least the advantages described below. Accordingly, an aspect of the present disclosure is to provide a method for providing information mapped between a plurality of inputs to map and provide data according to a multimodal interface input in a linked manner depending on a specified criterion and an electronic device for supporting the same.

In accordance with an aspect of the present disclosure, an electronic device is provided. An electronic device may include at least one microphone, a touch screen display, at least one processor configured to be electrically connected with the at least one microphone and the touch screen display, and memory configured to be electrically connected with the at least one processor.

According to an embodiment, the memory stores instructions, when executed, causing the at least one processor to: output a screen where a specified application is executed, the screen including a first interface configured to support recording a voice input through the at least one microphone and a second interface configured to receive content input of a user, on the touch screen display; pairing and storing in the memory each one of a plurality of recorded voice inputs to the first interface with a corresponding one of a plurality of content inputs to the second interface, thereby forming a voice-content pair, wherein the voice input and content input of each voice-content pair are contemporaneously recorded and received; receive a user input based on a keyword for specified content; select at least one recorded voice-content pair in response to the user input; convert recorded voice inputs of the at least one voice-content pair into text data; and output the converted text data on the touch screen display.

In accordance with another aspect of the present disclosure, a method for providing information mapped between a plurality of inputs in an electronic device is provided. The method includes outputting a first screen where a specified application is executed, the first screen including a first interface for supporting to record a voice input to the electronic device and a second interface for supporting a content input of a user; pair and store in the memory each one of a plurality of recorded voice inputs to the first interface with a corresponding one of a plurality of content inputs to the second interface, thereby forming a voice-content pair, wherein the voice input and content input of each voice-content pair are contemporaneously recorded and received; receiving a user input based on a keyword for specified content; select at least one recorded voice-content pair in response to the user input; converting recorded voice inputs of the at least one voice-content pair into text data; and outputting the converted text data.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
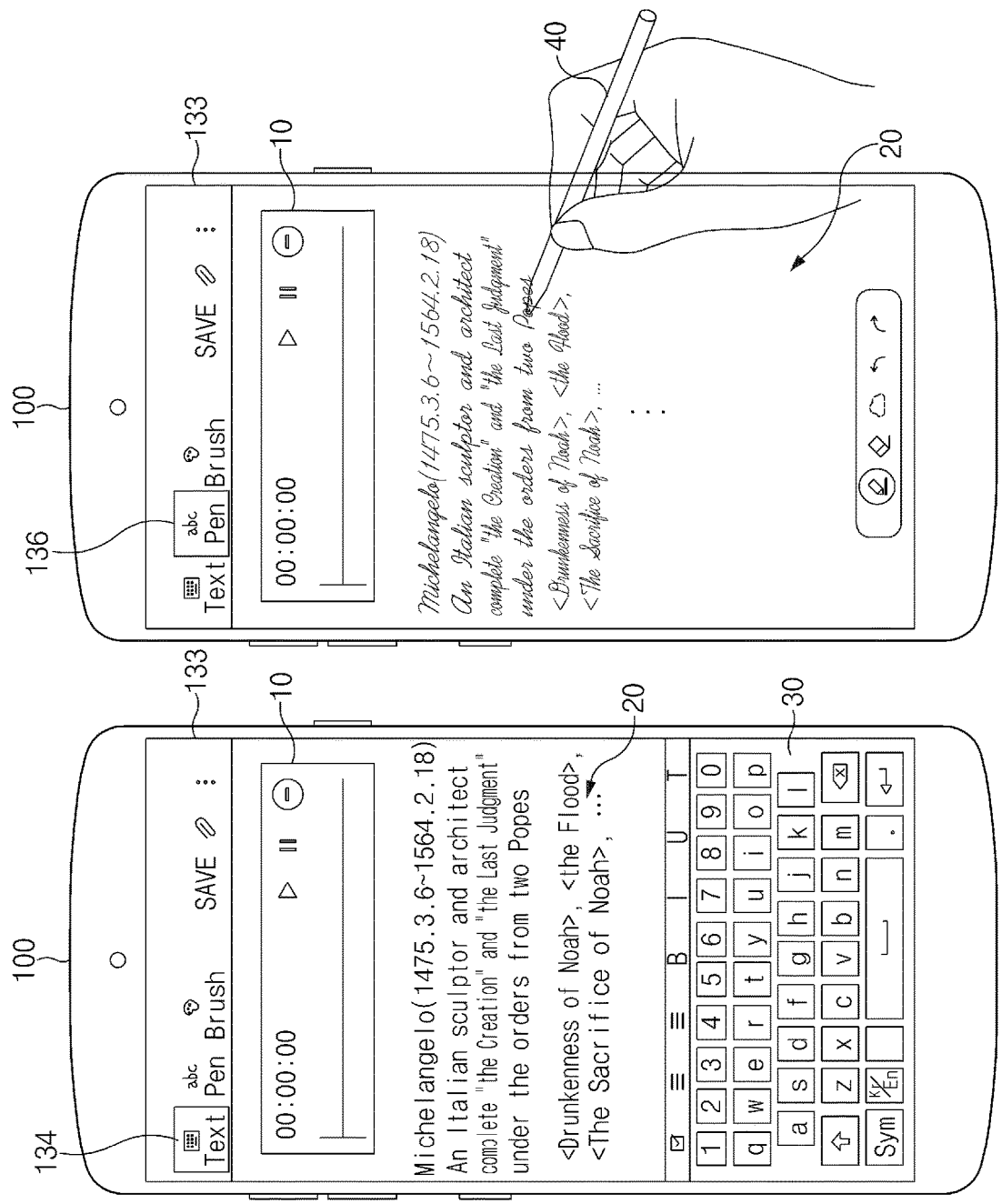
FIG. 1 is a drawing illustrating an operation of an electronic device according to an embodiment.

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art unless clearly indicated otherwise. It will be further understood that terms, which are defined in a dictionary and commonly used, should also be interpreted as is customary in the relevant related art and not in an idealized or overly formal unless expressly so defined in certain embodiments of the disclosure. In some cases, even if terms are terms which are defined in the disclosure, they may not be interpreted to exclude embodiments of the disclosure.

An electronic device according to certain embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to certain embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to certain embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to certain embodiments, the electronic device may be one of the above-described devices or a combination thereof An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to certain embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a drawing illustrating an operation of an electronic device according to an embodiment. In certain embodiments the user can record voice inputs in a first interface 10 and provide content input in a second interface 20. In one embodiment (left side), the content input can be entered using a keyboard 30. In another embodiment (right side) the content input can be entered using a stylus 40 on a writing interface 20.

Referring to FIG. 1, an electronic device 100 may execute an application (e.g., a note application). The application can supports user handwriting input based on a specified input interface in response to user control and may output a screen 133 where the application is executed. In an embodiment, the input interface may include at least one of a software input panel (SIP) keyboard 30 output on one region of a screen of the electronic device 100 or a stylus pen 40 mounted on the electronic device 100. In this regard, the at least one menu tab 134 and/or 136 for specifying an input interface which supports the user handwriting input (or setting a user handwriting input mode) may be provided on the screen 133 where the application is executed. For example, when a user input (e.g., touch) is applied to the first menu tab 134, the electronic device 100 may output the SIP keyboard 30. A user may provide a text input using the SIP keyboard 30. When a user input (e.g., touch) is applied to the second menu tab 136, the electronic device 100 may detect a signal of the stylus pen 40. The user may provide a handwriting input using the stylus pen 40. According to the above-mentioned details, the user handwriting input may be understood as the meaning including a text input or a marking input (e.g., an ungrammatical asterisk, underscore, tilde, check, or the like) based on the SIP keyboard 30 or the stylus pen 40. Hereinafter, the user handwriting input may be called a content input.

In an embodiment, the screen 133 where the application is executed may include a first interface 10 for operating a recording function loaded into the electronic device 100. The electronic device 100 may record and store a voice which occurs in an environment where the electronic device 100 is operated (or a voice received by the electronic device 100), in response to user control for the first interface 10, or may output the stored recording data. Furthermore, the screen 133 where the application is executed may include a second interface 20 for entering any information, such as content input. The electronic device 100 may receive a content input of the user, associated with entering the information, and may display the received content input on at least one region of the second interface 20. According to an embodiment, the second interface 20 may be expanded in vertical or horizontal scrolling form according to an amount, size, location, or the like of the input content.

In an embodiment, concurrently with recording a voice input received in response to user control for the first interface 10, the electronic device 100 may receive a content input of the user and may display the received content input on the second interface 20. For example, the electronic device 100 may receive a voice input and a content input, which are associated with the same event (e.g., a lecture or the like), and may record the received voice input or may display the received content input on its screen. In this operation, the electronic device 100 may map and store the recorded data and the input content data on the basis of the same time. For example, the electronic device 100 may map data recorded at the same time to content data input at the same time to store the mapped data in a database or to store the mapped data in the form of text.

In certain embodiments, mapping can include creating a data structure which associates the content input with the voice input. The electronic device 100 may store a plurality of recorded voice inputs and a corresponding plurality of content inputs. Each one of the plurality of recorded voice inputs can be mapped with a corresponding one of the plurality of content inputs, thereby forming voice-content pairs, wherein the voice input and the content input of the voice-content pairs are recorded and input contemporaneously, or during a common time period. The voice-content pairs can be indexed by time period and have various hashtag keywords.

In an embodiment, the electronic device 100 may visually or audibly provide second data mapped to first data requested or selected from a user input, in response to the user input provided to the first interface 10 or the second interface 20. For example, when data recorded at a first time is requested from user control for the first interface 10, concurrently with responding to the recording data request at the first time, the electronic device 100 may visually specify content data mapped to the recording data at the first time (or input at the first time) with reference to the database or index. Similarly, when content input at a second time is selected from user control for the second interface 20, concurrently with responding to the content selection at the second time, the electronic device 100 may visually or audibly provide recording data mapped to content data at the second time (recorded at the second time). Hereinafter, a description will be given of certain embodiments for providing information in response to a user input based on mapping of data (e.g., recording data and content data) generated or input at the same time and function operations of the components of the electronic device 100 implementing the embodiments.

Figure 2:
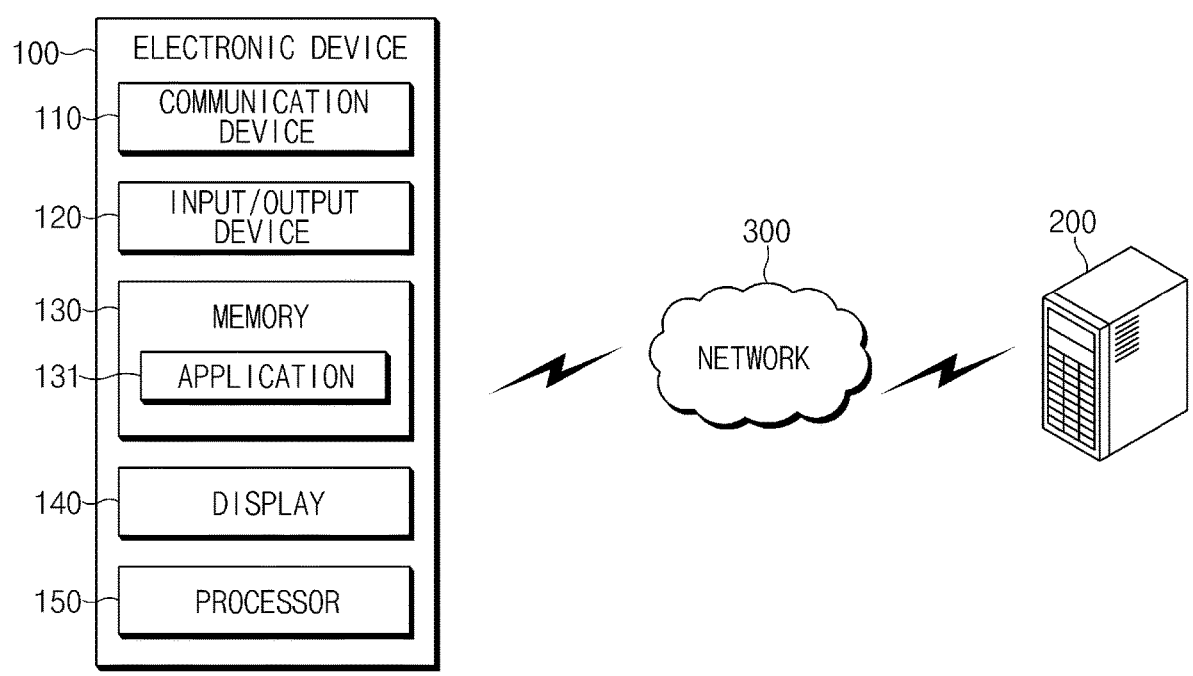
FIG. 2 is a block diagram illustrating a configuration of an electronic device according to an embodiment.

FIG. 2 is a block diagram illustrating a configuration of an electronic device according to an embodiment. The electronic device 100 communicates with an external device 200 over a network 300, such as, but not limited to, the internet Referring to FIG. 2, an electronic device 100 may include at least one of a communication circuitry 110, an input/output device 120, a memory 130, a display 140, or one or more processors 150 (from hereinafter, "processor" shall be understood to mean one or more processors regardless of the singular context). According to certain embodiments, the electronic device 100 may fail to include at least one of the above-mentioned components or may further include another component. For example, the electronic device 100 may further include a power supply (e.g., a battery) for supplying power to the components, a camera device (e.g., a front camera and/or a rear camera) for capturing an image (e.g., a still image, a video, or the like) for an area around the electronic device 100, or a sensor device (e.g., a proximity sensor, an illumination sensor, an acceleration sensor, a fingerprint sensor, an iris sensor, or the like) for sensing a variety of information about an environment where the electronic device 100 is operated. Alternatively, the electronic device 100 may further include components of an electronic device 901 which will be described below with reference to FIG. 9. At least some of function operations of the components of the electronic device 100, which will be described below, may be understood as being implemented under control of the processor 150 based on at least one instruction stored in the memory 130.

The communication circuitry 110 may support communication between the electronic device 100 and at least one external device 200. For example, the communication circuitry 110 may establish a connection with network 300 according to a defined protocol with the at least one external device 200 and may access the network 300 based on wired communication or wireless communication to transmit a signal or data to the at least one external device 200 or receive a signal or data from the at least one external device 200. According to certain embodiments, the at least one external device 200 may include the same type of device (e.g., a mobile device or the like) as the electronic device 100 or a different type of device (e.g., a server or the like) from the electronic device 100.

The input/output device 120 may receive or support the above-mentioned voice input or content input. For example, the input/output device 120 may include at least one microphone, an SIP keyboard (e.g., an SIP board 30 of FIG. 1), a keyboard, a mouse, a touch pad, a stylus pen (e.g., a stylus pen 40 of FIG. 1), or the like, which can be mounted on one region of the electronic device 100, is output on the electronic device 100, or is connected to the electronic device 100, and may receive a signal or data according to the voice input or the content input or may deliver the received signal or data to another component of the electronic device 100. Alternatively, the input/output device 120 may include at least one speaker loaded into one region of the electronic device 100 and may output a voice signal or data, which is generated by the electronic device 100 or is received from the at least one external device 200, to the outside of the electronic device 100. In an embodiment, at least a portion of the input/output device 120 (e.g., at least one microphone or the like) may always be controlled to be active (e.g., always on). Alternatively, when a user input (e.g., touch) is applied to the above-mentioned first interface (e.g., a first interface of FIG. 1), the at least portion of the input/output device 120 may be triggered and enabled. In an embodiment, the input/output device 120 may include a recording module for recording a voice signal or data input via the microphone.

The memory 130 may store at least one signal or data associated with operating the electronic device 100 or may store at least one instruction associated with function operations of the components of the electronic device 100. For example, the memory 130 may store voice data input based on the input/output device 120, content data, or recording data for the voice. In an embodiment, in connection with storing the recording data or the content data, the memory 130 may store the recording data and the content data at a specific time, which are mapped under control of the processor 150, in the form of a database or index. In this operation, the processor 150 may include information about the specific time, as identification information about the mapped recording data and content data at the specific time, in the database or index. In an embodiment, the memory 130 may store at least one application 131, which is loaded in the preloaded form when the electronic device 100 is manufactured or is downloaded in the third-party form from an online market (e.g., App Store). According to an embodiment, the at least one application 131 may include an application (e.g., a node application) which supports at least one of controlling a function operation of the input/output device 120 (e.g., the recording module or the like) (e.g., recording input voice data) or entering information (e.g., a content input) of a user.

As used herein, "memory" refers to the entire memory system of an electronic device as opposed to a particular module, chip, circuit, or type. Memory shall refer to both instruction memory and data memory.

The display 140 may output various screens. For example, the display 140 may output a screen when the electronic device 100 is operated (e.g., a home screen, a screen where the application 131 is executed (e.g., a screen 133 where an application is executed in FIG. 1)) in response to user control or specified scheduling information. Alternatively, the display 140 may display text or marking (e.g., an ungrammatical asterisk, underscore, tilde, check, or the like) according to a user input (e.g., a content input) on the screen where the electronic device 100 is operated. In certain embodiments, the display 140 may be implemented as a touch screen display including a display panel, a cover glass, and a touch panel (or a touch sensor). The display panel may output a related screen based on a specified driving signal. In this regard, the display 140 may include a display driver circuit for delivering a driving signal to the display panel. The display driver circuit may be electrically connected with the display panel and may deliver a driving signal corresponding to content information received from the processor 150 to the display panel at a specified frame rate. The cover glass may be disposed on an upper portion of the display panel to transmit light as the display panel outputs a screen. Furthermore, a user input (e.g., touch, drag, press, hovering, or the like) by a user's body (e.g., a finger) or a stylus pen (e.g., a stylus pen 40 of FIG. 1) may be applied to at least one region of the cover glass. The touch panel may perform detection (e.g., capacitive detection, resistive detection, infrared detection, ultrasonic detection, or the like) of a signal according to a user input (e.g., touch, drag, press, hovering, or the like) to output an electrical signal and may deliver information about the electrical signal to a touch controller (e.g., a touch IC) or the processor 150.

The processor 150 may be implemented as at least one of a central processing unit, an application processor, or a communication processor and may control the above-mentioned component (e.g., the communication circuitry 110, the input/output device 120, the memory 130, the display 140, or the like) of the electronic device 100. For example, the processor 150 may be electrically or operatively connected with at least one component and may deliver at least one instruction associated with a function operation to the component, or may perform various arithmetic operations, a variety of data processing, or the like. In an embodiment, the processor 150 may map a plurality of data generated or input based on execution of a specified application (e.g., a note application) (e.g., recording data according to recording of a voice input and content data according to a content input) based on a specified criterion (e.g., a time when the plurality of data are generated or input). In an embodiment, the processor 150 may respond to a user input applied to a screen where the application is executed or set, with reference to the mapped data. For example, in response to a user input for requesting or selecting specific data, concurrently with processing the request or selection, the processor 150 may visually specify or audibly provide data mapped to the specific data. A description will be given of various function operations of the processor 150, associated with this, with reference to the accompanying drawings.

Figure 3A:
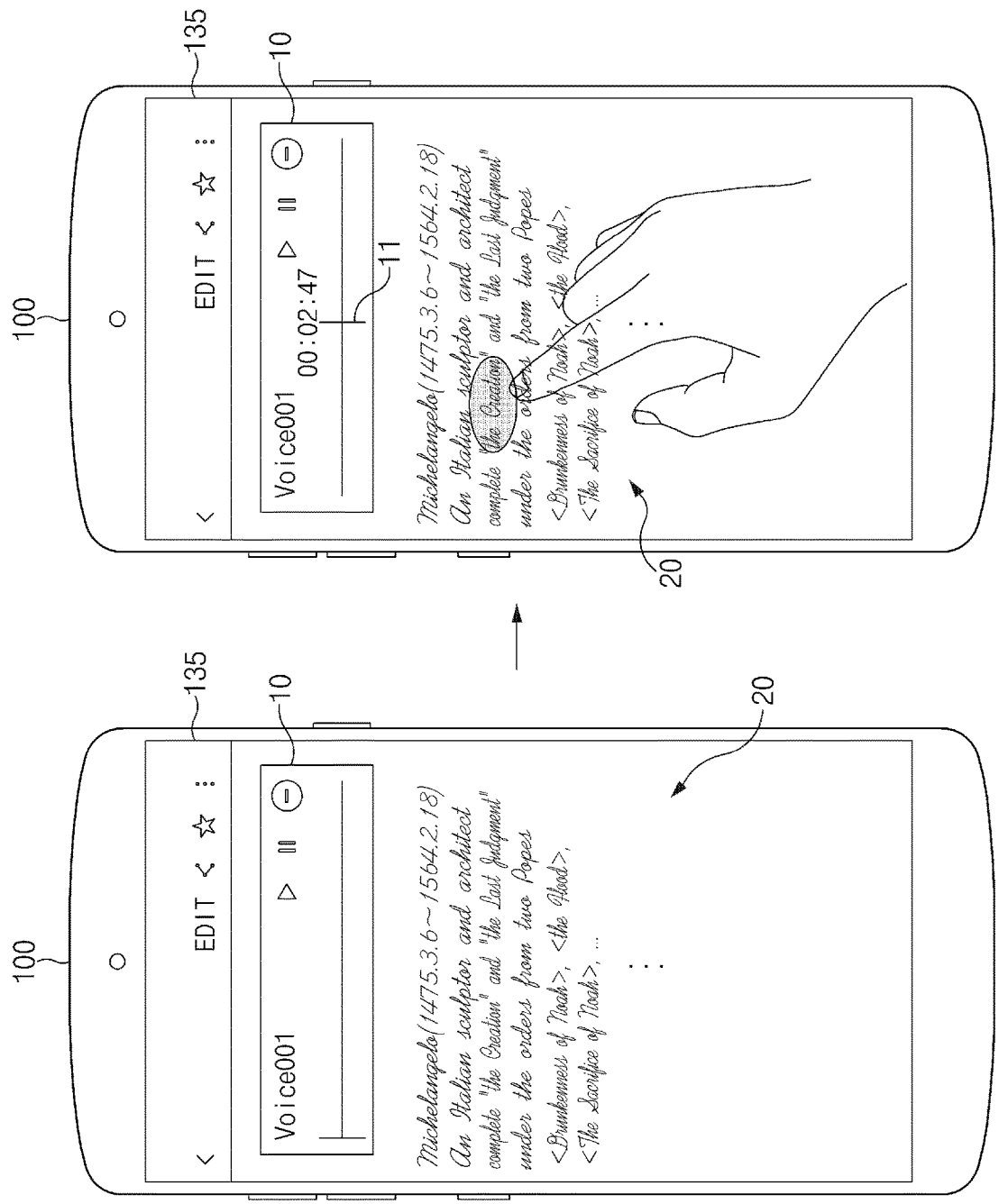
FIG. 3A is a drawing illustrating a type of response to a first user input of an electronic device according to an embodiment.
Figure 3B:
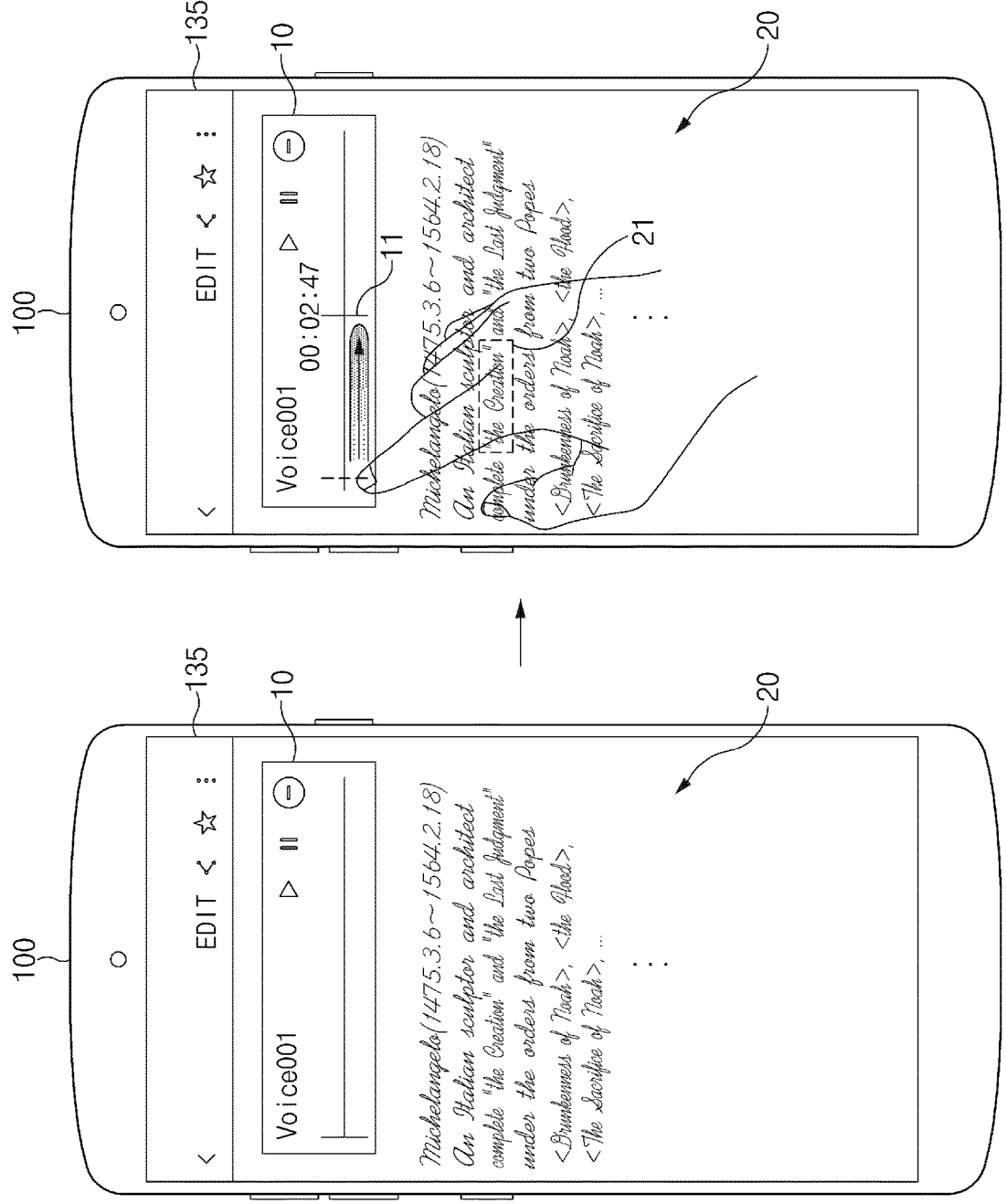
FIG. 3B is a drawing illustrating a type of response to a second user input of an electronic device according to an embodiment.
Figure 3C:
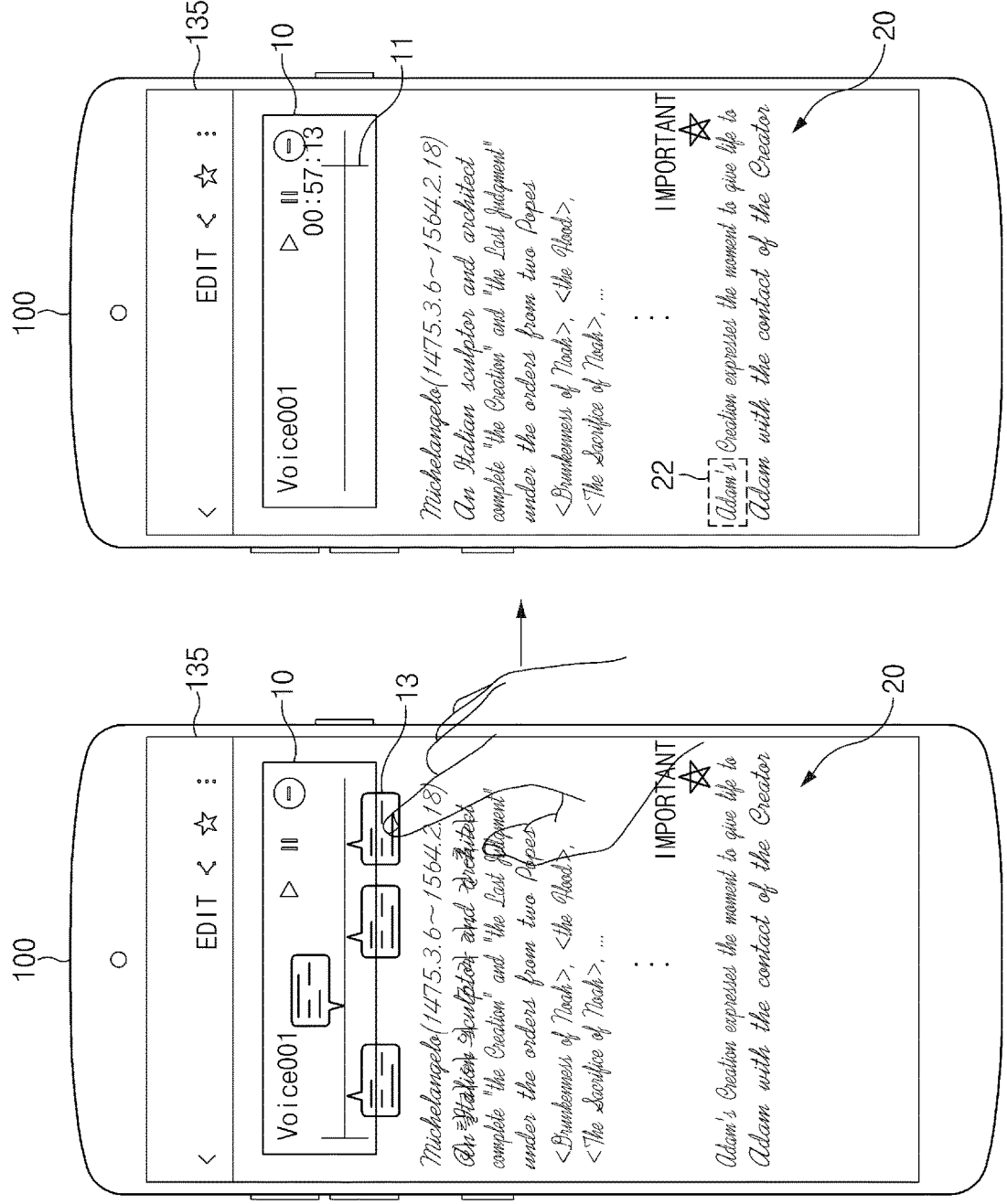
FIG. 3C is a drawing illustrating a type of response to a third user input of an electronic device according to an embodiment.
Figure 3D:
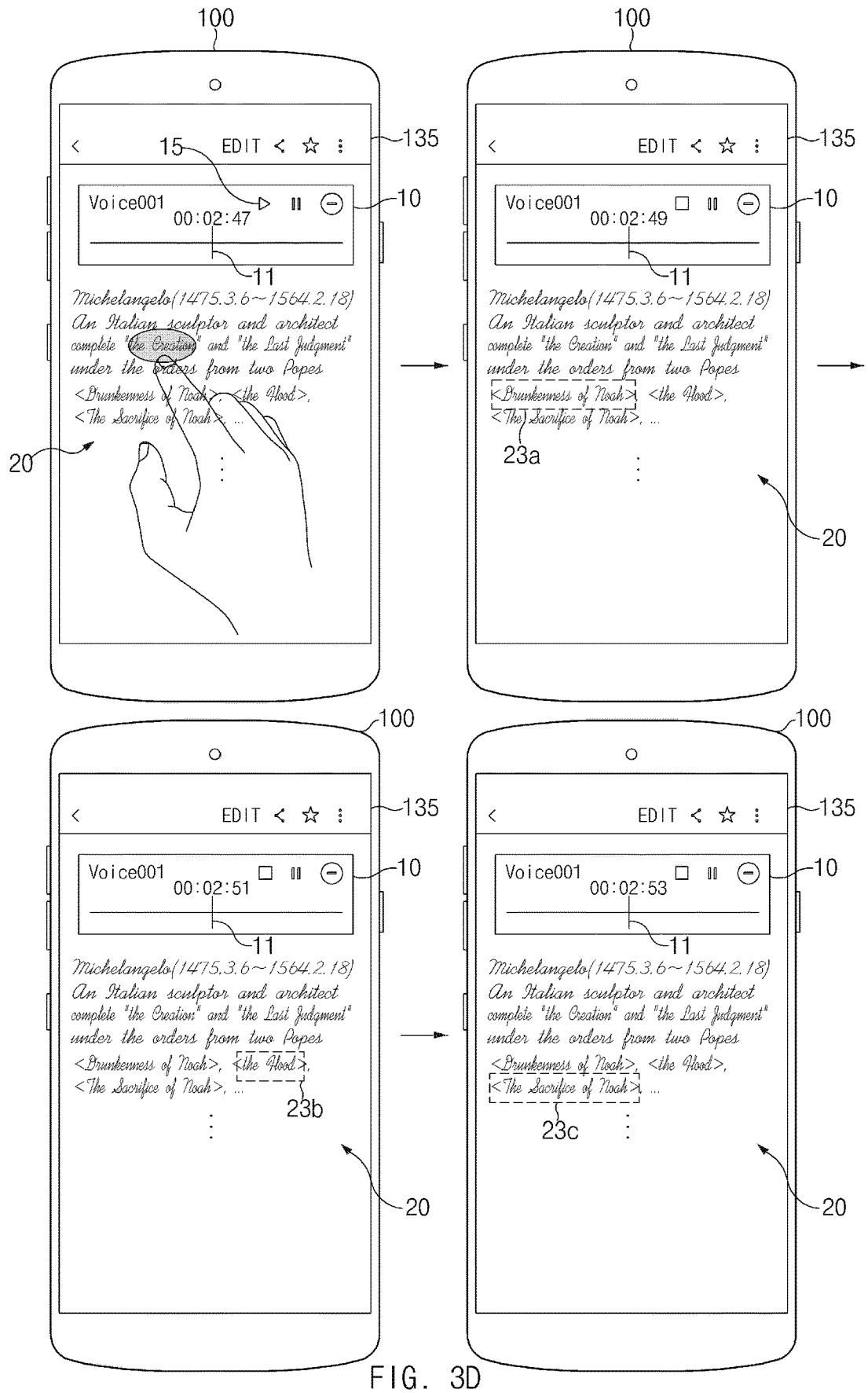
FIG. 3D is a drawing illustrating a form of displaying a graphic effect corresponding to recording playback of an electronic device according to an embodiment.

FIGS. 3A to 3C are drawings illustrating types of responses to various user inputs of an electronic device according to an embodiment. FIG. 3D is a drawing illustrating a form of displaying a graphic effect corresponding to recording playback of an electronic device according to an embodiment.

In FIG. 3A, 3B, 3C, or 3D, in a state where a processor (e.g., a processor 150 of FIG. 2) of an electronic device 100 performs mapping of recording data (the recording data may include recorded voice inputs) and content data of a specific event generated or input through execution of a specified application (e.g., a note application). The electronic device 100 may play the recording data and may output a screen 135 where an application is executed, which displays the content data, under user control for the application. The screen 135 where the application is executed, to which other drawings below refer, may be output in the same shape as that described above, and a duplicated description thereof may be omitted.

Referring to FIG. 3A, the processor 150 of the electronic device 100 may output the screen 135 where the application is executed. The screen 135 can include a first interface 10 for supporting to output (or play) recording data recorded during a certain time range and a second interface 20 for displaying content (e.g., text or marking (e.g., an ungrammatical asterisk, underscore, tilde, check, or the like)) input from a user during the certain time range. In an embodiment, the processor 150 may receive a first user input (e.g., the finger touch) for selecting specific content ("the Creation") among at least one content displayed on the second interface 20. In this case, the processor 150 may identify at least one stroke to which the first user input is applied and may assign a specified graphic effect (e.g., specified color display, ON/OFF display, or the like) to content of a word, phrase, or morpheme including the at least one identified stroke (e.g., text (the Creation) configured with a plurality of strokes). Alternatively, the processor 150 may assign the specified graphic effect to content to which the first user input is applied (e.g., marking configured with a single stroke).

In an embodiment, in the operation of assigning the specified graphic effect to the content according to the first user input, the processor 150 may identify recording data mapped to the content to which the graphic effect is assigned, with reference to a database or index on a memory (e.g., a memory 130 of FIG. 2). For example, the processor 150 may identify recording data recorded at the same time as a time when a stroke is initially input to the content to which the graphic effect is assigned. In an embodiment, the processor 150 may specify a point where the identified recording data is played on one region of the first interface 10.

For example, where the user has made a user input (by their finger) selecting specific content ("the Creation") among the written script, the processor 150 may automatically or in response to receiving the user input, move the position of the play bar or marker 11 to a position within the first interface 10 associated with a portion of the voice input that was recorded during the time that "the Creation" was written by the user.

In this regard, the first interface 10 may include a status bar indicating a state where recording data recorded during the certain time is played. The processor 150 may locate a movement bar 11 on a point (e.g., 00:02:47) where the identified recording data is played on the status bar. According to an embodiment, the first interface 10 may include at least one object for controlling to play recording data recorded during the certain time or stop the playback of the recording data. When a user input (e.g., touch) is applied to a play object in the state where the movement bar 11 is located on the point (e.g., 00:02:47) where the identified recording data is played, the processor 150 may control an input/output device (e.g., an input/output device 120 of FIG. 2) (e.g., a speaker) to output a voice starting from the identified recording data.

In certain embodiments, the opposite can occur. The user can move the movement bar 11 in first interface 10 to a position, such as 00:02:47, associated with a portion of the voice input. The processor 150 will automatically, or in response thereto, highlight the portion of the content, e.g., "the Creation", which was input at the time associated with 00:02:47.

Referring to FIG. 3B, the processor 150 may receive a second user input (e.g., drag) for controlling a location of the movement bar 11 included in the first interface 10. In this case, the processor 150 may identify recording data corresponding to a point (e.g., 00:02:47) where the movement bar 11 is located, depending on the second user input, with reference to a database or index of the memory 130. The processor 150 may identify content data mapped to the identified recording data (or input at the same time as a time when the identified recording data is recorded) and may assign the specified graphic effect to content 21 corresponding to the identified content data among at least one content displayed on the second interface 20. When a user input (e.g., touch) is applied to a play object included in the first interface 10, the processor 150 may output a voice starting from recording data corresponding to a play point (e.g., 00:02:47) where the movement bar 11 is located.

Referring to FIG. 3C, a thumbnail object 13 associated with content data mapped to recording data of a specific play point may be displayed on a region around the status bar included in the first interface 10. In an embodiment, when a third user input (e.g., touch) is applied to any one of the at least one thumbnail object 13, the processor 150 may locate the movement bar 11 on a play point (e.g., 00:57:13) corresponding to a location of the thumbnail object 13 to which the third user input is applied on the status bar. Furthermore, the processor 150 may identify content data corresponding to the thumbnail object 13 to which the third user input is applied (or mapped to recording data of the play point (e.g., 00:57:13) corresponding to a location of the selected thumbnail object 13) and may assign the specified graphic effect to content 22 corresponding to the identified content data among at least one content displayed on the second interface 20. When a user input (e.g., touch) is applied to a play button (the triangle pointed to the right) included in the first interface 10, the processor 150 may output a voice starting from recording data corresponding to the play point (e.g., 00:57:13) where the movement bar 11 is located.

Referring to FIG. 3D, in a state where the movement bar 11 included in the first interface 10 is moved to a play point (e.g., 00:02:47) of recording data mapped to content data associated with the first user input according to the above-mentioned first user input (e.g., a touch for selecting specific content among at least one content displayed on the second interface 20), the processor 150 may receive a user input (e.g., touch) applied to a play button 15 on the first interface 10. In this case, the processor 150 may output a voice starting from recording data corresponding to the play point (e.g., 00:02:47) where the movement bar 11 is located. In this operation, the processor 150 may identify content data mapped to recording data corresponding to a point where the movement bar 11 is moved according to the progress of the voice output, with reference to a database or index on the memory 130. The content data may be data that was entered at the time the voice recording of 00:02:47 was recorded. For example, when the movement bar 11 is moved from a first play point (e.g., 00:02:47) to a second play point (e.g., 00:02:49) depending on the progress of the voice output, the processor 150 may identify content data mapped to recording data corresponding to the second play point (e.g., 00:02:49). The processor 150 may assign a specified graphic effect to first content 23a corresponding the identified content data among at least one content displayed on the second interface 20. After assigning the graphic effect to the first content 23a, similarly, the processor 150 may sequentially assign a specified graphic effect to second content 23b corresponding to a third play point (e.g., 00:02:51) and third content 23c corresponding to a fourth play point (e.g., 00:02:53) as the movement bar 11 is moved according to the progress of the voice output. According to certain embodiments, the configuration for sequentially assigning the graphic effect to the content 23a, 23b, and 23c depending on the progress of the voice output is applicable in the same or similar manner when outputting the voice starting from the recording data of the play point where the movement bar 11 is located in FIG. 3B or 3C.

Figure 4:
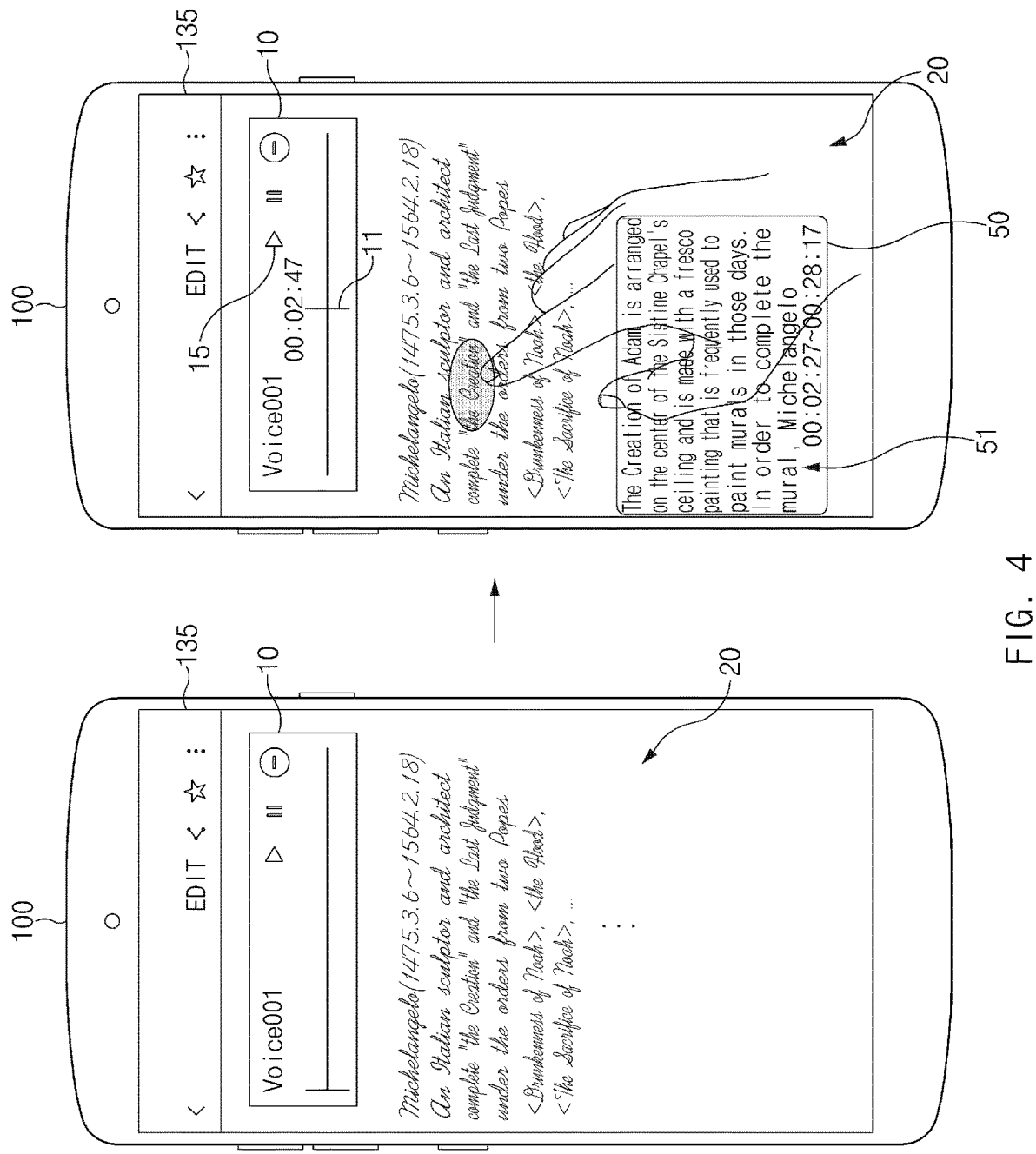
FIG. 4 is a drawing illustrating a type of response to a fourth user input of an electronic device according to an embodiment.
Figure 5:
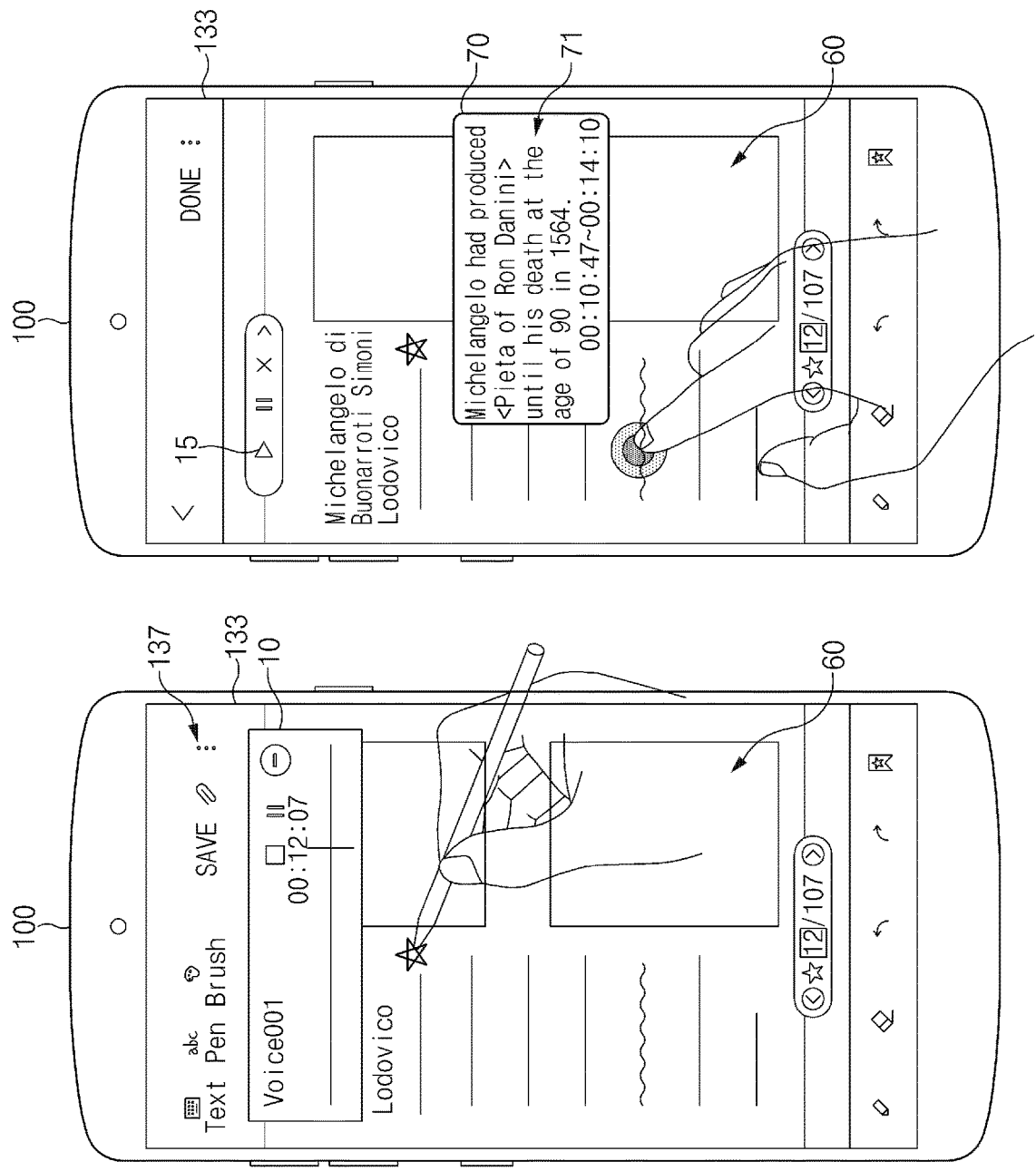
FIG. 5 is a drawing illustrating a type of response to a fourth user input of an electronic device according to another embodiment.
Figure 6:
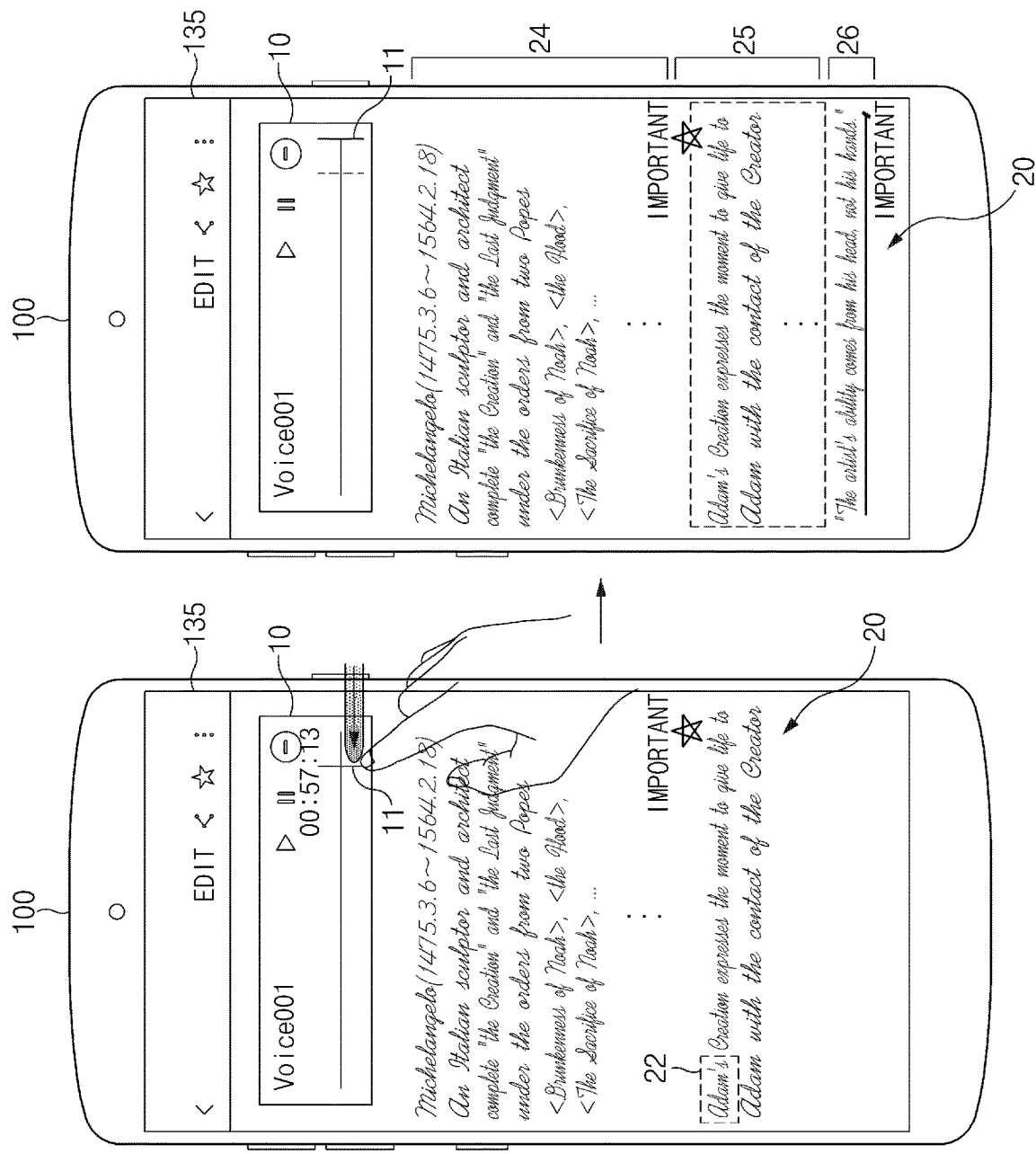
FIG. 6 is a drawing illustrating a type of response to a fifth user input of an electronic device according to an embodiment.

FIGS. 4 and 5 are drawings illustrating types of responses to a fourth user input of an electronic device according to certain embodiments. FIG. 6 is a drawing illustrating a type of response to a fifth user input of an electronic device according to an embodiment.

In FIG. 4, the user touches a portion of the content input, e.g., "the Creation" in the second interface. Responsive thereto, the movement bar 11 moves to a position associated with recorded voice data that was recorded at the time "the Creation" was entered into the second user interface. Additionally, a third interface 50 appears, converting to text, voice data that was recorded 20 seconds before of "the Creation." The user can then touch text in the third interface 50. Responsive to touching the text in the third interface, such as "In order", the processor causes the electronic device to play the recorded voice data that resulted in conversion to "In order."

Referring to FIG. 4, a processor (e.g., a processor 150 of FIG. 2) of an electronic device 100 may receive a fourth user input (e.g., double touch) for selecting specific content (e.g., the Creation) among at least one content displayed on a second interface 20. In this case, similar to a response to the above-mentioned first user input (e.g., a touch for selecting specific content among the at least one content displayed on the second interface 20), the processor 150 may locate a movement bar 11 included in a first interface 10 on a play point (e.g., 00:02:47) of recording data mapped to content data associated with a fourth user input. Furthermore, the processor 150 may identify recording data recorded before a specified time (e.g., 20 seconds before) from the recording data mapped to the content data associated with the fourth user input (e.g., recording data corresponding to the play point (00:02:47)) (e.g., recording data corresponding to the play point (00:02:27), with reference to a database or index on a memory (e.g., a memory 130 of FIG. 2). The processor 150 may convert the identified recording data into a text 51 and may output a third interface 50 including the converted text 51. In an embodiment, the processor 150 may output a voice starting from the recording data before being converted into the text 51 in response to a user input (e.g., touch) applied to one region of the third interface 50.

In FIG. 5, the user can input content data that includes non-verbal data in the second interface while recording voice data in the first interface 10. The user can then select a specific portion of the non-verbal data (the wavelike line). An interface 70 appears converting to text voice data that was recorded before a specified time of the wavelike line.

Referring to FIG. 5, the processor 150 may output a screen 133 where an application (e.g., a note application) is executed, including a first interface 10 for operating a recording function loaded into the electronic device 100 and a second interface (not shown) (e.g., a second interface 20 of FIG. 1) for entering any information, such as content information. In an embodiment, the processor 150 may receive a user input for importing a specified file (e.g., a PDF file, an e-mail file, a message file, or the like) using a third menu tab 137 (e.g., a more menu tab) provided on one region of the screen 133. In this case, the processor 150 may output fourth interface 60 according to the execution of the file on an upper layer of the second interface (not shown) included in the screen 133. According to an embodiment, the interface 60 may include at least one content (e.g., a text, an image, or the like) according to information included in the file.

In an embodiment, concurrently with recording a voice input received via a microphone in response to user control for the first interface 10, the processor 150 may receive a content input of a user and may display the received content input on the fourth interface 60. According to an embodiment, in the embodiment described with reference to FIG. 5, the content input of the user may be understood as a marking input including a non-verbal asterisk, underscore, tilde, check, or the like. The processor 150 may map the recorded recording data to the input content data on the basis of the same time and may store the mapped data in the form of a database or index.

In an embodiment, the processor 150 may receive a fourth user input (e.g., double touch) for selecting specific marking content (e.g., tilde marking) among at least one marking content displayed on the fourth interface 60. In response to the reception of the fourth user input, the processor 150 may identify recording data recorded before a specified time (e.g., 20 seconds before) (e.g., recording data recorded at a time (00:10:47) from recording data (e.g., recording data recorded at a time (00:11:07)) mapped to marking content data associated with the fourth user input with reference to the database or index. The processor 150 may convert the identified recording data into a text 71 and may output a fifth interface 70 including the converted text 71. In an embodiment, the processor 150 may output a voice starting from recording data before being converted into the text 71 in response to a user input (e.g., a touch) applied to a play button 15 or a user input (e.g., touch) applied to one region of the fifth interface 70.

Referring to FIG. 6, the processor 150 may receive a fifth user input (e.g., drag) for controlling a location of the movement bar 11 included in the first interface 10. In an embodiment, the fifth user input may be understood as an input for returning the movement bar 11 from a current location to a specific play point (e.g., 00:57:13) at a previous time. The processor 150 may identify content data mapped to recording data corresponding to the specific play point (e.g., 00:57:13) (or input at the same time as a time when the recording data is recorded). The processor 150 may assign a specified graphic effect to content 22 corresponding to the identified content data among at least one content displayed on a second interface 20.

In an embodiment, the processor 150 may receive a user input for controlling new recording from the specific play point (e.g., 00:57:13) (e.g., a long press of greater than or equal to a specified time on a play button included in the first interface 10). For example, the processor 150 may receive a user input for controlling recording of an overwrite mode for a voice input received by the electronic device 100, starting from the specific play point (e.g., 00:57:13). Furthermore, concurrently with newly recording the voice input, the processor 150 may receive a new content input of a user and may display the received content input on the second interface 20. In this case, the processor 150 may identify at least one content data input at a third time corresponding to between a first time corresponding to the specific play point (e.g., 00:57:13) and a second time when the new content input is received, with reference to a database or index of the memory 130. The processor 150 may assign a specified graphic effect (e.g., a dim effect or the like) to content 25 corresponding to at least one content data input at the third time among at least one content displayed on the second interface 20. In other words, except for content 24 displayed before the first time and content 26 displayed after the second time, the processor 150 may assign the specified graphic effect to content 25 displayed at the third time in a limited manner. Furthermore, the processor 150 may release mapping between content data input at the third time and recording data recorded at the third time on the database or index.

Figure 7A:
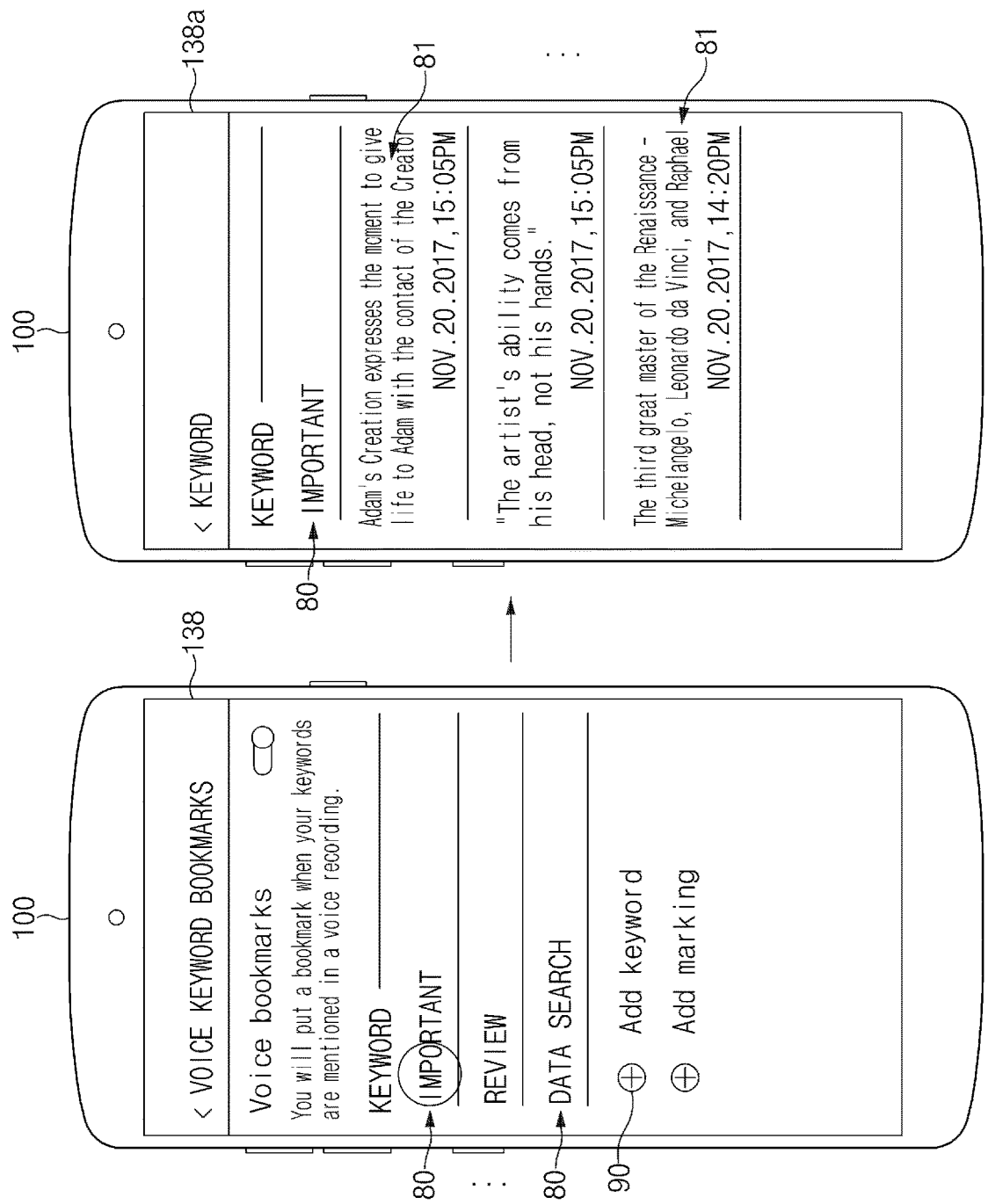
FIG. 7A is a drawing illustrating a type of response to a sixth user input of an electronic device according to an embodiment.
Figure 7B:
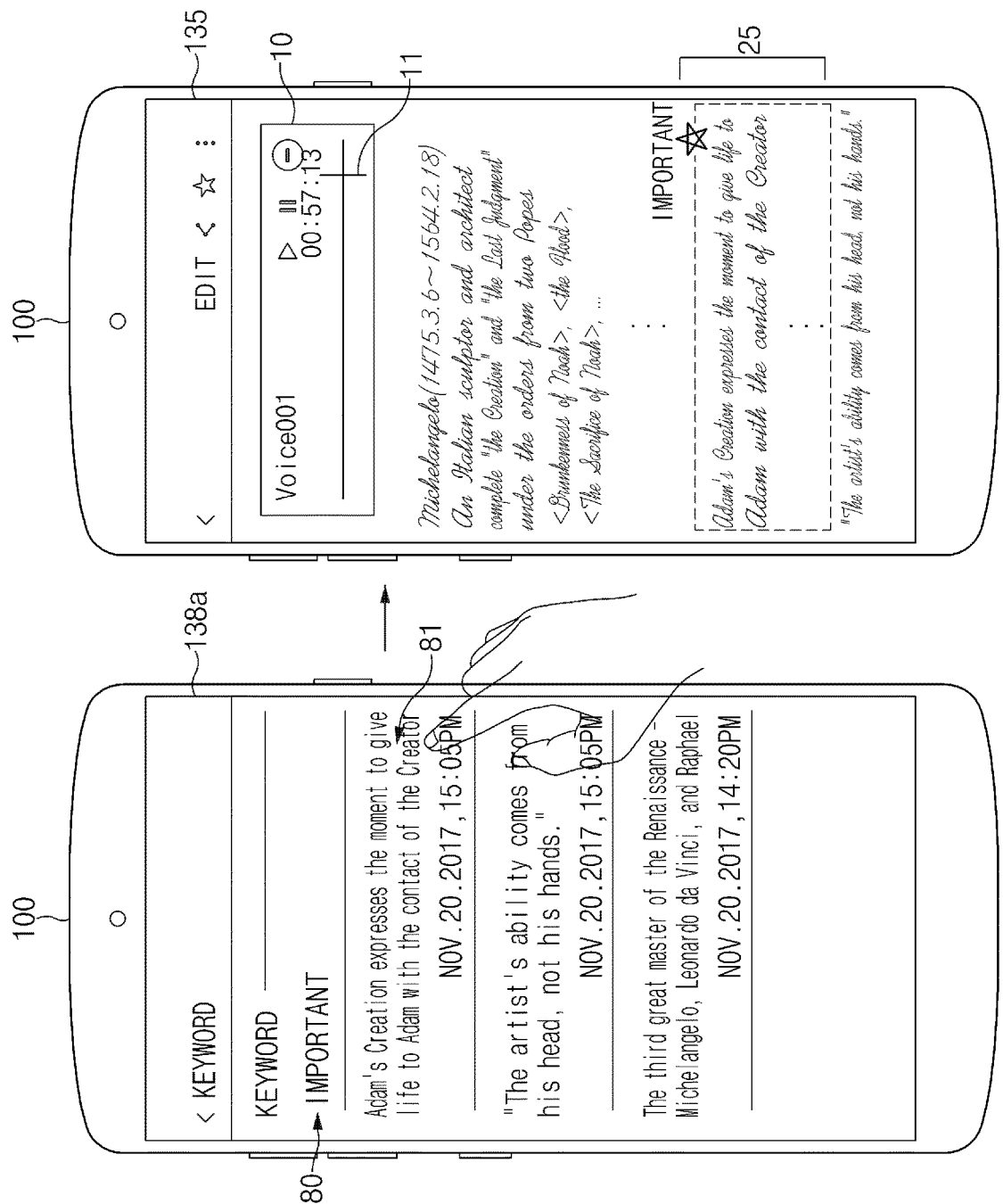
FIG. 7B is a drawing illustrating a type of response to a seventh user input of an electronic device according to an embodiment.
Figure 7C:
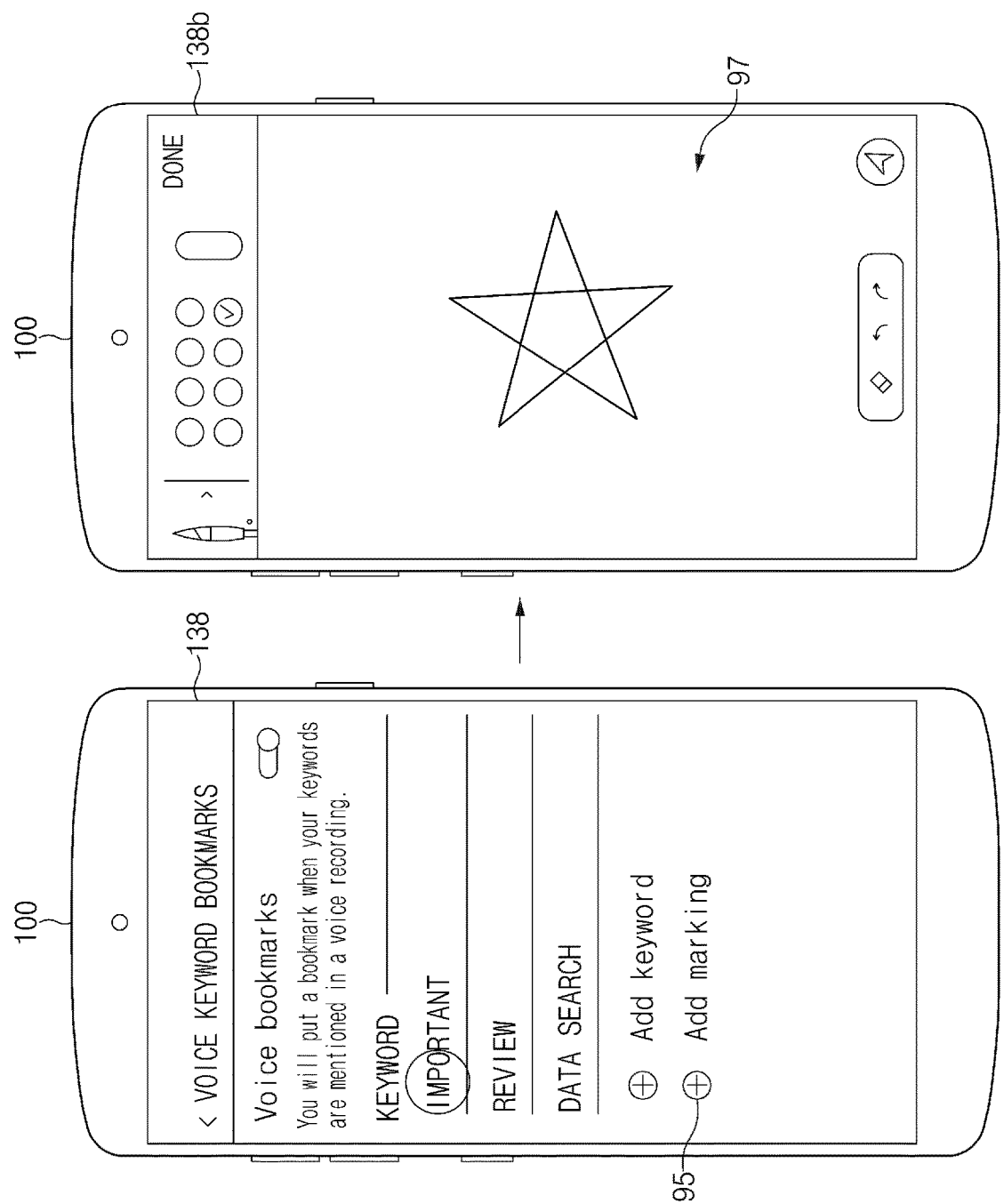
FIG. 7C is a drawing illustrating a form of registering specific information associated with processing a seventh user input of an electronic device according to an embodiment.

FIGS. 7A and 7B are drawings illustrating types of responses to various user inputs of an electronic device according to an embodiment. FIG. 7C is a drawing illustrating a form of registering specific information associated with processing a seventh user input of an electronic device according to an embodiment.

Referring to FIG. 7A, a screen where the above-mentioned application (e.g., the note application) is executed may include a screen 138 where the application is set. In an embodiment, a user of an electronic device 100 may search for some of at least one recording data previously recorded (or content data mapped to the some of the at least one recording data) on the screen 138. In this regard, the screen 138 may support to register a keyword for searching for the some of the at least one recording data. According to an embodiment, the keyword may be understood as content corresponding to content data (for example, an annotated bookmark, "Important") mapped to the some of the at least one recording data to be searched (e.g., a text in the form of a work, phrase, or morpheme or non-verbal marking (an asterisk, an underscore, a tilde, a check, or the like)). The user may apply an input (e.g., touch) to a fourth menu tab 90 provided to one region of the screen 138 to register at least one keyword. A processor 150 may display at least one keyword 80 registered from the user on one region of the screen 138 in the form of a list. The user may select a keyword (e.g., important) corresponding to recording data (or content data mapped to the recording data) to be searched among the at least one content 80. In this case, the processor 150 may identify or collect at least one recording data mapped to content data including the keyword (e.g., important) (or recorded at a time when content data including the keyword is input) (which can referred to as a "voice/content pair"), with reference to a database or index on a memory (e.g., a memory 130 of FIG. 2). The processor 150 may convert the at least one identified or collected recording data into text data 81 and may display the at least one converted text data 81 in the form of a list through conversion into another screen 138a where the application is set.

Referring to FIG. 7B, when a user input (e.g., touch) is applied to any one of the at least one text data 81 displayed in the form of the list, the processor 150 may identify content data mapped to recording data before being converted into the text data, with reference to the database or text. The processor 150 may convert the other screen 138a into a screen 135 where the application is executed and may focus content 25 corresponding to the identified content data among at least one content displayed on the screen 135. Furthermore, the processor 150 may locate a movement bar 11 in a first interface 10 included in the screen 135 on a play point (e.g., 00:57:13) of recording data mapped to the identified content data. In an embodiment, when a user input (e.g., touch) is applied to a play object in the first interface 10, the processor 150 may output a voice starting from recording data corresponding to the play point (e.g., 00:57:13).

Referring to FIG. 7C, the processor 150 may provide a fifth menu tab 95 for supporting to register ungrammatical marking (e.g., an asterisk, an underscore, a tilde, a check, or the like) as the keyword on one region of the screen 138 where the application is set. In an embodiment, when a user input (e.g., touch) is applied to the fifth menu tab 95, the processor 150 may convert the screen 138 into the other screen 138a. The other screen 138a may include, for example, a sixth interface 97 capable of receiving a content input corresponding to the marking based on a stylus pen (e.g., a stylus pen 40 of FIG. 1). In an embodiment, similarly, a keyword according to a content input applied to the sixth interface 97 may be displayed in the form of a list on one region of the screen 138 where the application is set.

An electronic device according to certain embodiments may include at least one microphone, a touch screen display, at least one processor configured to be electrically connected with the at least one microphone and the touch screen display, and a memory configured to be electrically connected with the at least one processor.

According to certain embodiments, the memory may store instructions, when executed, causing the at least one processor to output a screen where a specified application is executed, the screen including a first interface for supporting to record a voice input via the at least one microphone and a second interface for supporting a content input of a user, on the touch screen display, map and store voice data recorded at a first time based on the first interface and content data input at the first time based on the second interface in the memory, receive a user input for searching for at least one voice data mapped to specified content data based on a keyword for specified content, collect at least one voice data mapped to the specified content data in response to the user input, convert the at least one collected voice data into text data, and output the converted text data on the touch screen display.

According to certain embodiments, the memory may store further instructions, when executed, causing the at least one processor to display at least one of a status bar indicating a state where recorded voice data is played or a movement bar indicating a point where the recorded voice data is played on the status bar on one region of the first interface.

According to certain embodiments, the memory may further store instructions, when executed, causing the at least one processor to display at least one content according to a content input of the user on one region of the second interface and assign a specified graphic effect to first content in response to a specified first user input for selecting the first content among the at least one content.

According to certain embodiments, the memory may further store instructions, when executed, causing the at least one processor to locate the movement bar on a point where first voice data mapped to first content data associated with the first content is played on the status bar in response to the specified first user input.

According to certain embodiments, the memory may further store instructions, when executed, causing the at least one processor to output a voice starting from a point where the first voice data is played, identify second content data mapped to at least one second voice data recorded at a time after the first voice data, and assign the specified graphic effect to at least one second content associated with the second content data in an order corresponding to the progress of the voice output.

According to certain embodiments, the memory may further store instructions, when executed, causing the at least one processor to display at least one content according to a content input of the user on one region of the second interface, identify third content data mapped to third voice data corresponding to a location of the movement bar in response to a specified second user input for controlling the location of the movement bar, and assign a specified graphic effect to third content associated with the third content data among the at least one content.

According to certain embodiments, the memory may further store instructions, when executed, causing the at least one processor to display at least one thumbnail indicating content data mapped to the recorded voice data on a region around the status bar.

According to certain embodiments, the memory may further store instructions, when executed, causing the at least one processor to display at least one content according to a content input of the user on one region of the second interface and assign a specified graphic effect to fourth content associated with a first thumbnail among the at least one content in response to a specified third user input for selecting the first thumbnail among the at least one thumbnail.

According to certain embodiments, the memory may further store instructions, when executed, causing the at least one processor to display at least one content according to a content input of the user on one region of the second interface and identify fourth voice data recorded before a specified time from recording data mapped to fourth content data associated with fifth content in response to a specified fourth user input for selecting the fifth content among the at least one content.

According to certain embodiments, the memory may further store instructions, when executed, causing the at least one processor to convert the fourth voice data into text data and output a third interface including the converted text data on one region of the screen where the application is executed.

According to certain embodiments, the memory may further store instructions, when executed, causing the at least one processor to display a first object for controlling to play recorded voice data on one region of the first interface and output a voice starting from a point where the fourth voice data is played in response to a specified fifth user input applied to the first object.

According to certain embodiments, the memory may further store instructions, when executed, causing the at least one processor to receive a content input of the user, the content input including at least one of text or ungrammatical marking input using at least one of a software input panel (SIP) keyboard output on the touch screen display and a stylus pen mounted on one region of the electronic device and display at least one content according to the content input on one region of the second interface.

According to certain embodiments, the memory may store instructions, when executed, causing the at least one processor to return the movement bar to a point where the recording voice data is played at a previous time and map and store fifth voice data newly recorded and fifth content data input at the same time as the fifth voice data in response to a specified sixth user input for controlling new recording from the previous time.

According to certain embodiments, the memory may further store instructions, when executed, causing the at least one processor to display at least one content according to a content input of the user on one region of the second interface, identify at least one sixth content data input at a time between the previous time and a time when the fifth content data is input, and assign a specified graphic effect to sixth content corresponding to the sixth content data among the at least one content.

Figure 8:
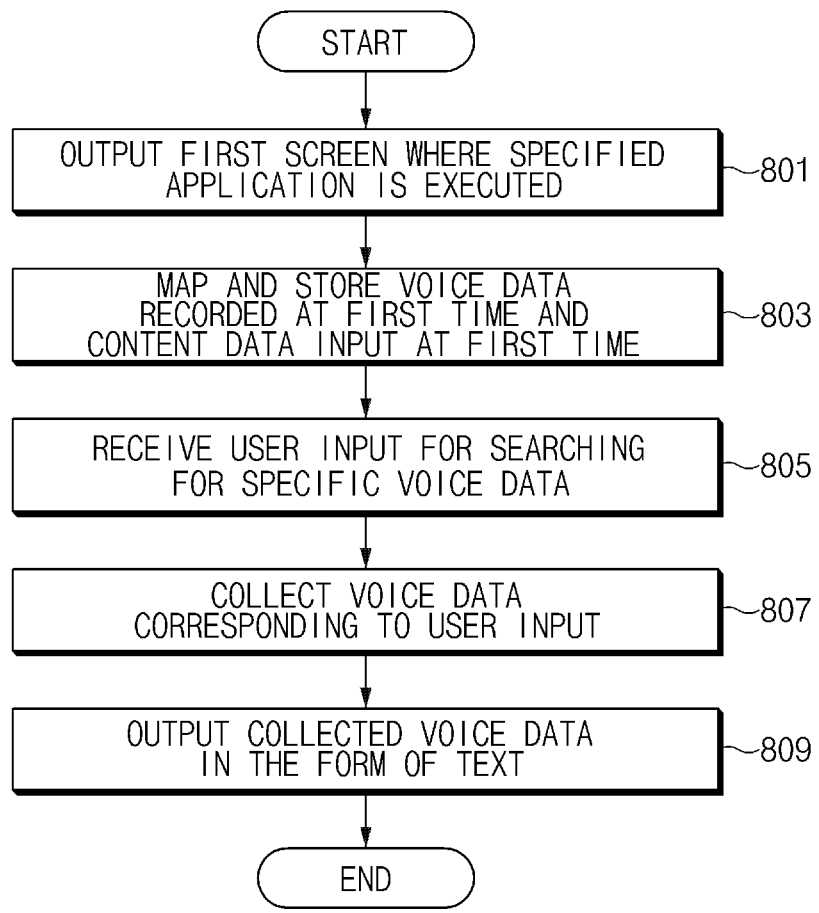
FIG. 8 is a flowchart illustrating a method for providing information mapped between a plurality of inputs in an electronic device according to an embodiment.

FIG. 8 is a flowchart illustrating a method for providing information mapped between a plurality of inputs in an electronic device according to an embodiment. Operations described with reference to FIG. 8 may be implemented under control of a processor (e.g., a processor 150 of FIG. 2) based on at least one instruction capable of being stored in a memory (e.g., a memory 130 of FIG. 2).

In operation 801, the processor 150 of an electronic device (e.g., an electronic device 100 of FIG. 2) may execute a specified application (e.g., a note application) in response to user control and may output a first screen where the application is executed. In an embodiment, the first screen may include at least one of a first interface for operating a recording function loaded into the electronic device 100 or a second interface for supporting a content input of a user.

In operation 803, the processor 150 may map and store voice data recorded at a first time through the first screen and content data input at the first time. In this regard, concurrently with recording a voice input received by the electronic device 100 in response to user control for the first interface, the processor 150 may receive a content input of the user and may display the received content input on the second interface. In this operation, the processor 150 may map the recorded voice data to the input content data on the basis of the same time and may store the mapped data in the form of a database or index.

In operation 805, the processor 150 may receive a user input for searching for specific voice data among the at least one recorded voice data. In this regard, the processor 150 may output a second screen where the application is executed (e.g., a screen where the application is set) (or switch from the first screen to the second screen) in response to user control and may display at least one keyword registered from the user on one region of the second screen. In an embodiment, the keyword may be understood as content corresponding to content data mapped to voice data to be searched (e.g., a text in the form of a word, phrase, or morpheme or ungrammatical marking (e.g., an asterisk, an underscore, a tilde, a check, or the like)). The user may provide a user input for selecting a keyword corresponding to voice data to be searched among the at least one displayed keyword.

In operation 807, the processor 150 may collect voice data corresponding to the user input. For example, the processor 150 may identify content data including a keyword selected from the user input with reference to the database or index and may collect at least one voice data mapped to the identified content data.

In operation 809, the processor 150 may output the at least one collected voice data in the form of text. In this regard, the processor 150 may convert the at least one collected voice data into text data. In an embodiment, the processor 150 may convert the second screen where the application is executed into a third screen where the application is executed (e.g., another screen where the application is set) and may output the converted text data on one region of the third screen in the form of a list.

According to an embodiment, any one of the at least one text data displayed in the form of the list is selected by the user, the processor 150 may identify content data mapped to voice data before being converted into the text data, with reference to the database or index. The processor 150 may convert the third screen into the first screen where the application is executed and may focus content corresponding to the identified content data among at least one content displayed on the first screen.

A method for providing mapped information between a plurality of inputs in an electronic device according to certain embodiments may include outputting a first screen where a specified application is executed, the first screen including a first interface for supporting to record a voice input to the electronic device and a second interface for supporting a content input of a user, mapping and storing voice data recorded at a first time based on the first interface and content data input at the first time based on the second interface, receiving a user input for searching for at least one voice data mapped to specified content data based on a keyword for specified content, collecting at least one voice data mapped to the specified content data, converting the at least one collected voice data into text data, and outputting the converted text data.

According to certain embodiments, the method may further include outputting a second screen where the specified application is executed, the second screen supporting to register the keyword, and providing a menu associated with registering the keyword on one region of the second screen.

According to certain embodiments, the providing of the menu associated with registering the keyword may include displaying at least one keyword registered according to user control through the menu on one region of the second screen.

According to certain embodiments, the receiving of the user input may include receiving a user input for selecting any one of the at least one keyword displayed on the one region of the second screen.

According to certain embodiments, the outputting of the converted text data may include receiving a user input for selecting any one of at least one output text data and converting the second screen into the first screen in response to the user input for selecting the any one of the at least one output text data.

According to certain embodiments, the converting into the first screen may include displaying at least one content corresponding to content data input from the user on one region of the second interface included in the first screen and focusing content corresponding to the selected text data among the at least one content.

Figure 9:
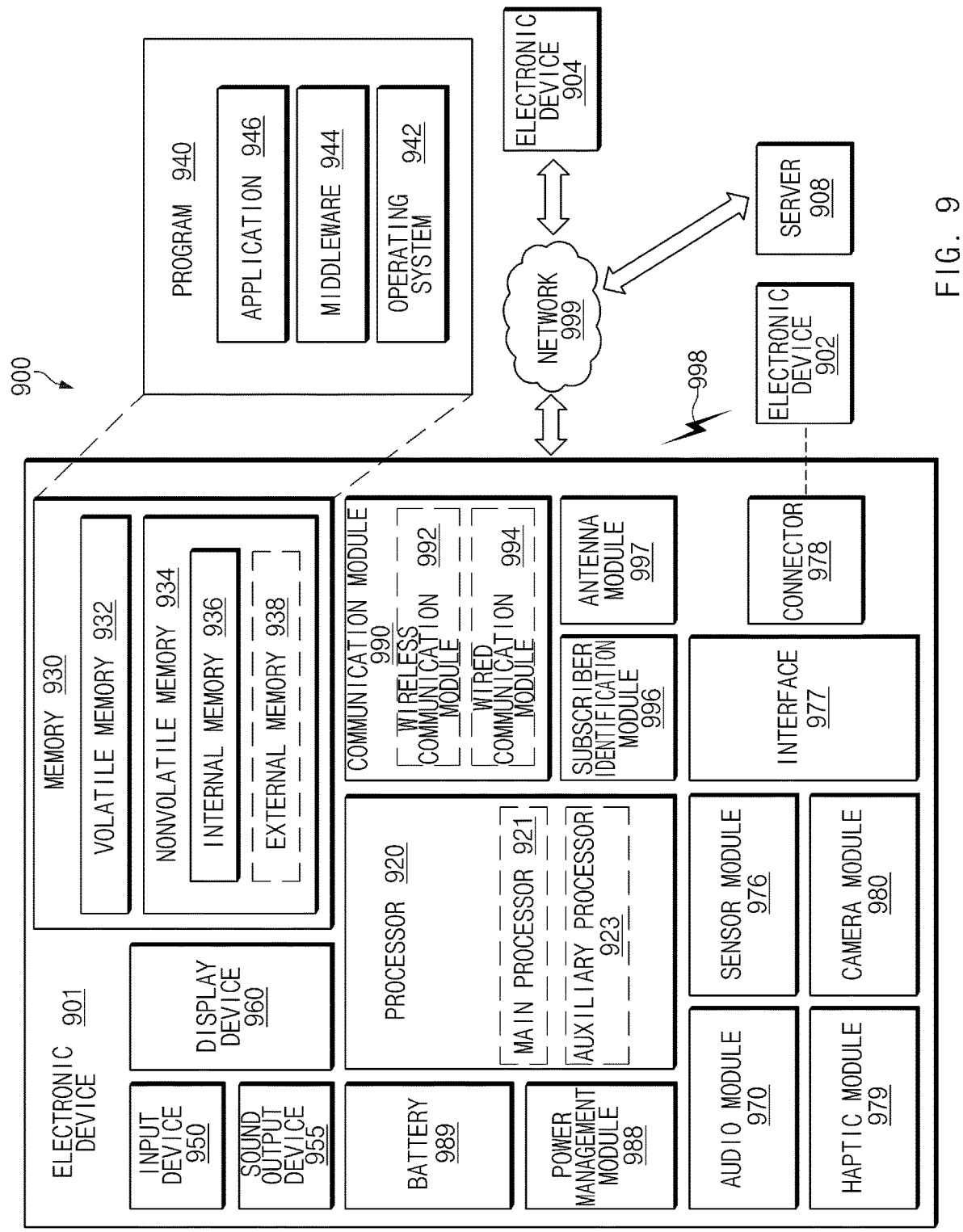
FIG. 9 is a block diagram illustrating an electronic device in a network environment according to certain embodiments.

FIG. 9 is a block diagram illustrating an electronic device 901 in a network environment 900 according to certain embodiments.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, the electronic device may provide information associated with the mapped data in a complex manner by mapping recording data and content data (e.g., text data or the like), which are associated with the same event, depending on a specified criterion.

In addition, various effects ascertained directly or indirectly through the disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    at least one microphone;
    a touch screen display;
    at least one processor electrically connected with the at least one microphone and the touch screen display; and
    memory electrically connected with the at least one processor,
    wherein the memory stores instructions, when executed, cause the at least one processor to:
    output a screen where a specified application is executed, the screen including a first interface configured to support recording a voice input through the at least one microphone and a second interface configured to receive content input of a user, on the touch screen display;
    pairing and storing in the memory each one of a plurality of recorded voice inputs to the first interface with a corresponding one of a plurality of content inputs to the second interface, thereby forming a voice-content pair, wherein the voice input and content input of each voice-content pair are contemporaneously recorded and received;
    receive a user input based on a keyword for specified content;
    select at least one recorded voice-content pair in response to the user input;
    convert recorded voice inputs of the at least one voice-content pair into a corresponding at least one text data after the at least one recorded voice-content pair is selected;
    output the at least one text data on the touch screen display;
    receive a user selection of a selected one of the at least one text data on the touch screen display; and
    display a content input of a voice-content pair corresponding to the selected at least one text data responsive to the user selection.

2. The electronic device of claim 1, wherein the memory further stores instructions, when executed, causing the at least one processor to:
    display at least one of a status bar indicating a state where recorded voice inputs are played or a movement bar indicating a point where the recorded voice inputs are played on a status bar on one region of the first interface.

3. The electronic device of claim 2, wherein the memory further stores instructions, when executed, causing the at least one processor to:
    display at least one content according to content input of the user on one region of the second interface; and
    assign a specified graphic effect to a first content of the at least one content in response to a specified first user input for selecting the first content.

4. The electronic device of claim 3, wherein the memory further stores instructions, when executed, causing the at least one processor to:
    move the movement bar to a point where first voice input mapped to the first content is played on the status bar in response to the specified first user input.

5. The electronic device of claim 4, wherein the memory further stores instructions, when executed, causing the at least one processor to:
    output audio starting from the point where the first voice input is played;
    identify second content data mapped to at least one second voice input recorded at a time after the first voice input; and
    assign the specified graphic effect to at least one second content associated with the second content data in an order corresponding to progress of the output audio.

6. The electronic device of claim 2, wherein the memory further stores instructions, when executed, causing the at least one processor to:
    return the movement bar to a point where the recording voice input is played at a previous time; and
    map and store new voice input and new content input at a same time as the new voice input, in response to a specified user input for controlling new recording from the previous time.

7. The electronic device of claim 6, wherein the memory further stores instructions, when executed, causing the at least one processor to:
    display at least one content according to a content input of the user on one region of the second interface;
    identify at least one sixth content data input at a time between the previous time and a time when the fifth content data is input; and
    assign a specified graphic effect to sixth content corresponding to the sixth content data among the at least one content.

8. The electronic device of claim 2, wherein the memory further stores instructions, when executed, causing the at least one processor to:
    display at least one content according to content input of the user on one region of the second interface;
    identify first content of the at least one content mapped to a first voice input corresponding to a location of the movement bar in response to user input for controlling the location of the movement bar; and
    assign a specified graphic effect to content associated with the first content among the at least one content.

9. The electronic device of claim 2, wherein the memory further stores instructions, when executed, causing the at least one processor to:
    display at least one thumbnail indicating content inputs mapped to the recorded voice inputs on a region around the status bar.

10. The electronic device of claim 9, wherein the memory further stores instructions, when executed, causing the at least one processor to:
    display at least one content according to a content input of the user on one region of the second interface; and
    assign a specified graphic effect to content associated with a first thumbnail in response to a specified user input for selecting the first thumbnail.

11. The electronic device of claim 1, wherein the memory further stores instructions, when executed, causing the at least one processor to:
    display at least one content according to content input of the user on one region of the second interface; and
    identify voice input recorded before a specified time from voice input mapped to content input associated with user selected content.

12. The electronic device of claim 11, wherein the memory further stores instructions, when executed, causing the at least one processor to:
    convert the voice input into text data; and
    output a third interface including the converted text data on one region of the screen where the application is executed.

13. The electronic device of claim 12, wherein the memory further stores instructions, when executed, causing the at least one processor to:
    display a first object for playing the voice input on one region of the first interface; and
    output audio starting from the voice input in response to a selection of the first object.

14. The electronic device of claim 1, wherein the memory further stores instructions, when executed, causing the at least one processor to:
    receive content input of the user, the content input including at least one of text or ungrammatical marking input using at least one of a software input panel (SIP) keyboard output on the touch screen display and a stylus pen mounted on one region of the electronic device; and
    display at least one content according to the content input on one region of the second interface.

15. The electronic device of claim 1, wherein displaying the content input of the voice-content pair corresponding to the selected at least one text data comprises highlighting the content.

16. A method for providing information mapped between a plurality of inputs in an electronic device, the method comprising:
    outputting a first screen where a specified application is executed, the first screen including a first interface for supporting to record a voice input to the electronic device and a second interface for supporting a content input of a user;
    pair and store in memory each one of a plurality of recorded voice inputs to the first interface with a corresponding one of a plurality of content inputs to the second interface, thereby forming a voice-content pair, wherein the voice input and content input of each voice-content pair are contemporaneously recorded and received;
    receiving a user input based on a keyword for specified content;
    select at least one recorded voice-content pair in response to the user input;
    converting recorded voice inputs of the at least one voice-content pair into a corresponding at least one text data after the at least one recorded voice-content pair is selected; and
    outputting the at least one text data;
    receiving a user selection of a selected one of the at least one text data on the touch screen display; and
    displaying a content input of a voice-content pair corresponding to the selected at least one text data responsive to the user selection.

17. The method of claim 16, further comprising:
    outputting a second screen where the specified application is executed, the second screen supporting to register the keyword; and
    providing a menu associated with registering the keyword on one region of the second screen.

18. The method of claim 17, wherein the providing of the menu associated with registering the keyword comprises:
    displaying at least one keyword registered according to user control through the menu on one region of the second screen.

19. The method of claim 18, wherein the receiving of the user input comprises:
    receiving user input for selecting any one of the at least one keyword displayed on the one region of the second screen.

* * * * *